Figure 1:
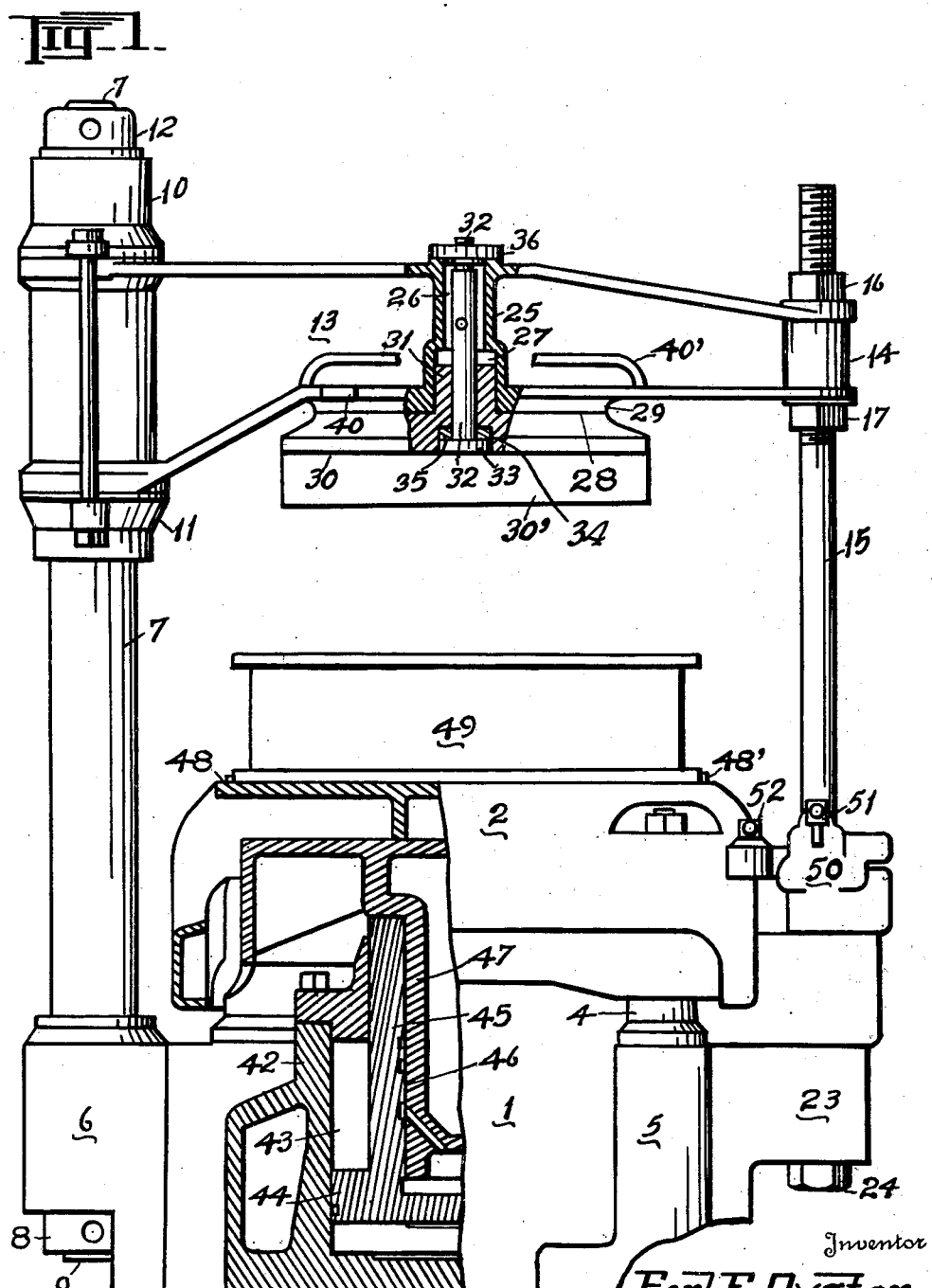

Nov. 29, 1949 E. F. OYSTER 2,489,810
MOLDING MACHINE
Filed Jan. 21, 1946 3 Sheets-Sheet 1

Inventor
Earl F. Oyster
By
Charles W Dake
Attorney

Nov. 29, 1949  E. F. OYSTER  2,489,810
MOLDING MACHINE
Filed Jan. 21, 1946  3 Sheets-Sheet 2
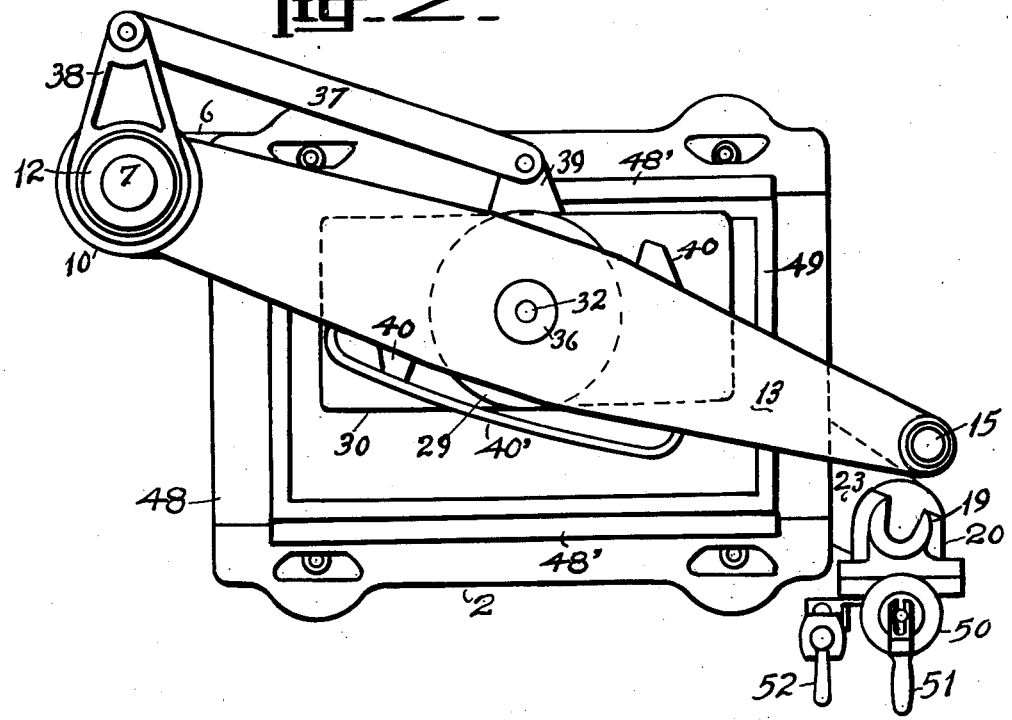
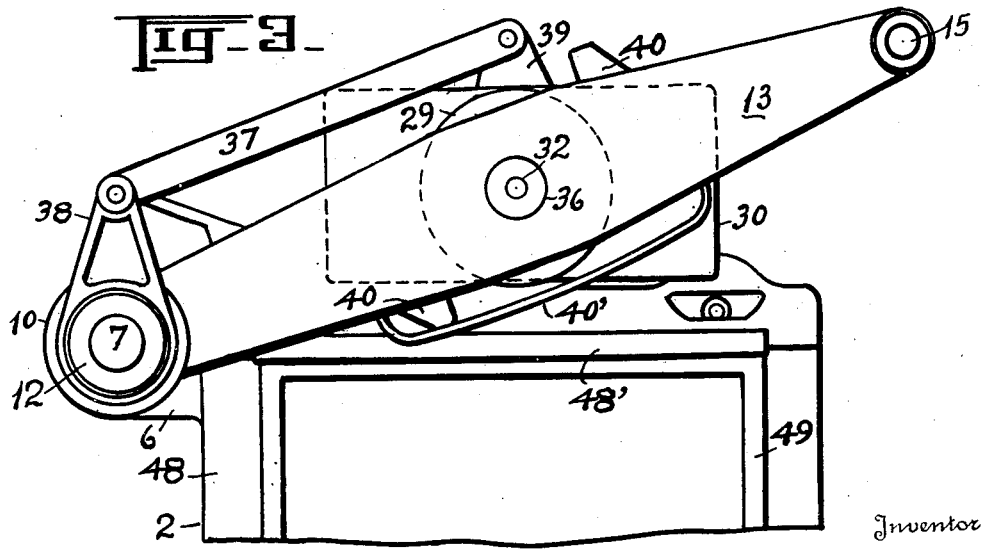
Inventor
Earl F. Oyster
By
Charles W. Dake
Attorney

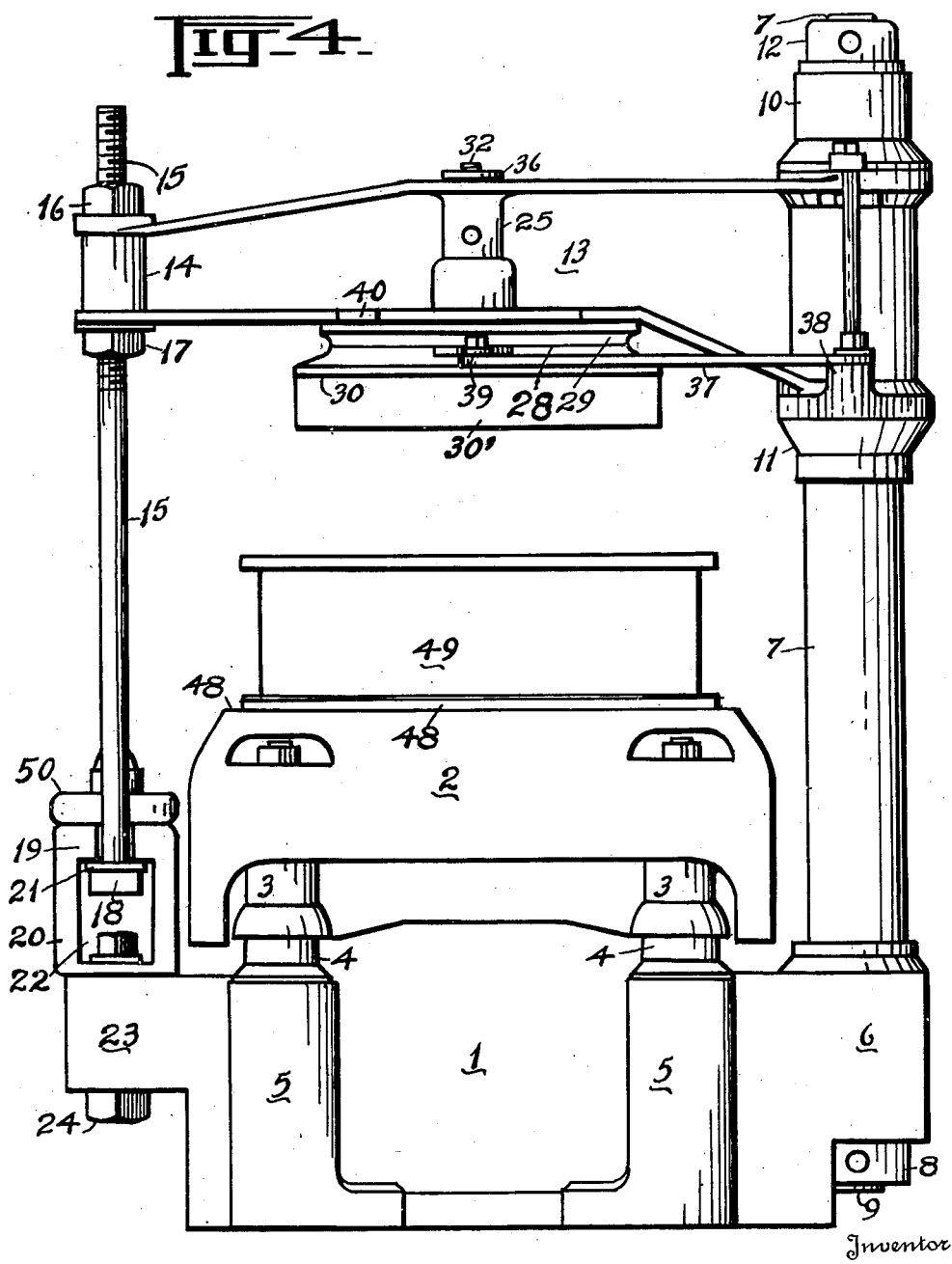

Patented Nov. 29, 1949

2,489,810

UNITED STATES PATENT OFFICE 2,489,810

MOLDING MACHINE

Earl F. Oyster, Cleveland, Ohio

Application January 21, 1946, Serial No. 642,503

2 Claims. (Cl. 22—44)

My present invention relates to improvements in metal founding and particularly to molding machines employed in metal founding for producing molds in which to form metal castings; and the objects of my improvements are: First, to provide a molding machine that requires less floor space than existing molding machines of like capacity; second, to provide a molding machine whereof the mold pressure arm is not required to be swung through as great an arc as the mold pressure arm of existing molding machines of like capacity; third, to provide a molding machine having a mold pressure plate turnably carried by the mold pressure arm; fourth, to provide a molding machine in which the mold pressure plate will be swung out of alignment with the mold pressure arm when the mold pressure arm is swung; fifth, to provide a molding machine whereof the mold pressure plate will be parallel with the foundry flask throughout the swing of the mold pressure arm.

These named objects and such other objects as appear from a perusal of the machine's description are obtained by the molding machine structure illustrated in the accompanying drawing, in which:

Figure 1 is a front elevation view in part section with the mold pressure arm and plate in position as when a mold is being produced in the foundry flask, which is shown mounted on the mold and flask supporting mechanism of the machine. Figure 2 is a plan view of the machine in which the mold pressure arm and plate are above the foundry flask mounted on the machine with the mold pressure arm unlatched as when being swung from its latching mechanism. Figure 3 is a plan view of the machine in which the mold pressure arm and plate are swung clear of the foundry flask mounted on the machine. Figure 4 is a rear elevation view of the molding machine in which the mold pressure arm and plate are in position for pressing a mold in a foundry flask mounted on the molding machine with the pressure arm in its latched position.

Throughout the accompanying drawings, similar numerals refer to similar parts and portions of my improved molding machine.

Numeral 1 refers to the base of the molding machine, 2 the mold and flask supporting mechanism in part supported by a plurality of stools 3 having pistons 4 extending into cylinders 5 and moveable upward by air under pressure admitted by suitable valve mechanism into the lower end of the cylinders.

Numeral 6 refers to an extension of the base 1 and has extending upward therefrom a mold pressure arm supporting column 7 which is socketed into the extension 6 and fastened therein by a nut 8 screw-threaded onto the end 9 of the column 7. Swingably supported on the column 7 between the collars 10 and 11 and locked thereon by ring nut 12 and on bearings carried thereby, is a mold pressure arm 13 having at its outer end a boss 14 provided with a bore through which extends a vertical pressure arm tie rod 15 screw-threaded at its upper end to receive nuts 16 and 17 which securely hold the rod 15 against vertical displacement when drawn tightly against the upper and lower ends of the boss 14 and serve as longitudinal adjusting means for the tie rod.

The mold pressure arm tie rod 15 has a head 18 at its lower end, between which head and the under side of the slotted flange 19 of the tie rod latch bracket 20, a hard steel wear resisting washer plate 21 engages the said slotted flange in the pocket 22, the tie rod latch bracket is secured to the base extension 23 by bolts 24.

The mold pressure arm 13 has intermediate its ends, hollow sleeve like boss 25 having a bore 26 extending to the top of the arm and bore 27 of larger diameter than the bore 26 extending from said bore 26 to the machined face 28 of the large mold pressure plate engaging boss 29 against which the rotatable mold pressure plate designated by numeral 30 and having mold pressure block 30' fastened thereto is held with its hub 31 by a spindle bolt 32 having its head 33 socketed in recess 34 with packing like fibre bearing ring 35 between the upper side of the head and the bottom of the said recess. At the upper end of the spindle bolt 32 and screw threaded thereon is a flange nut 36 whereby the mold pressure plate 30 is drawn and held with sufficient force only to retain the pressure plate against the surface 28 of the boss 29 and yet permit the mold pressure plate to be readily rotated. This is done by the long link 37 pivotally connected to a bracket 38 extending from collar 11 fastened on and stationary with mold pressure arm supporting column 7. The opposite end of the long link 37 is pivotally connected to a bracket 39 which extends the mold pressure plate 30. Pivotal connection of the link 37 with the bracket 38 of the collar 11 and with the bracket 39 of the mold pressure plate, permits rotation of the mold pressure plate against the large boss 29 of the mold pressure arm 13. From the lower web of the mold pressure arm extends at each of its side edges, stop lugs 40 and hand rail 41' whereby the mold pressure arm 13 may be swung manually by the operator of the molding machine standing at a side of the machine for unlatching the vertically disposed tie rod 15 from the tie rod latch bracket 20.

Within the base 1 of the molding machine, but forming no part of the present invention, is a cylinder 42, having slidable therein by air pressure, a piston 44 having a cylindrical portion 45 in which is a bore 46 having slidable therein a mold-squeeze piston 47 forming an extension of a flask support and mold jolt table 48 mounted on which is shown a foundry flask 49. Air under pressure is admitted to the under side of the said pistons 44 and 47 through suitable ports having tubular connection with an air control valve housing 50 which is diagrammatically shown in Figures 1 and 2 with the valves therein operated by valve handles 51 and 52.

From the aforesaid description, it will be seen that when the mold pressure arm 13 is swung to its unlatched position shown in Figure 3, the mold pressure plate 30 will be swung with the arm and will have its long sides parallel with the sides of the foundry flask 49 by the extended link 37 pivotally connected to bracket 38 extending from collar 11 held stationary on column 7 and to bracket 39 extending from the mold pressure plate 30. It will be noted that as the distance between the pivot pins of the brackets 38 and 39 remain the same throughout the total swing of the mold pressure arm, the relative final position of the mold pressure plate will be the same and the corner of said mold pressure plate nearest the tie rod 15 and boss 14 will project outward of the mold pressure arm and thereby increased swing of the mold pressure arm is permitted. The supporting column 7 for the mold pressure arm can be positioned at a less distance from the center line extending parallel with the sides of the foundry flask side guides 48 and that the base of the molding machine may be considerably narrower than the base of molding machines whereof the mold pressure arm is limited in its swing and the mold pressure plate is stationary with the mold pressure arm.

Having described and illustrated my present invention the rights thereto I desire to obtain by Letters Patent, are:

1. A molding machine comprising a frame having horizontally rectangular flask support thereon, a mold pressure arm pivotally mounted on the frame on a vertical axis adjacent one corner of the flask support, the pressure arm extending horizontally and diagonally over the flask support in its effective position, a mold pressure plate pivotally connected to the pressure arm on a vertical axis at a location centrally above the flask support when the pressure arm is in its effective position, the pressure arm pivotal to a position with the pressure plate thereon in a withdrawn position from over the flask support, an arm extending laterally of the pressure plate, a stationary arm fixedly attached to the frame, a link pivotally connected between the arm and the stationary arm with the pivotal connections of the pressure arm, pressure plate to the pressure arm, and the ends of the link to the arms being in parallelogram arrangement whereby the mold pressure plate moves rectilinearly on pivotal motion of the pressure arm to effective and withdrawn position.

2. A molding machine comprising a frame having a rectangular flask support thereon, a mold pressure arm pivotally mounted on the frame on a vertical axis adjacent one corner of the flask support and extending horizontally thereover in its effective position, a mold pressure plate pivotally mounted on a vertical axis on the pressure arm centrally above the flask support when the pressure arm is in its effective position, the pressure arm also movable to a position with the pressure plate withdrawn horizontally from above the flask support, a link pivotally connected at one end to one side of the pressure plate laterally of the pivotal connection thereof to the pressure arm, the link being pivotally connected at its other end to a fixed portion of the frame at a location at a distance from the pivot of the pressure arm equal to the distance from the pivot of the pressure plate to the pivotal connection thereof to the link, the pivot of the pressure arm and the pivotal connection of the link to the fixed portion of the frame located in a plane parallel to the plane of the pivotal connection of the link thereto, and the pivotal connections at the both ends of the link being equal to the distance between the pivot of the pressure arm and the pressure plate.

EARL F. OYSTER.

REFERENCES CITED

The following references are of record in the file of this patent:

UNITED STATES PATENTS

| Number | Name | Date |
|---|---|---|
| 236,301 | Broadmeadow | Jan. 4, 1881 |
| 920,561 | Fredericks | May 4, 1909 |
| 1,249,994 | Nicholls | Dec. 11, 1917 |
| 1,268,768 | Pitfield | June 4, 1918 |
| 1,367,078 | Nicholls | Feb. 1, 1921 |
| 1,661,598 | Byerlein | Mar. 6, 1928 |
| 1,824,009 | Bullock | Sept. 22, 1931 |
| 2,114,111 | Magnuson | Apr. 12, 1938 |